United States Patent

Hickox et al.

[15] 3,641,931

[45] Feb. 15, 1972

[54] ANALYZING, ORIENTING AND PRINTING MEANS IN TICKET HANDLING MECHANISM

[72] Inventors: Thomas A. Hickox; Gordon H. May; Joseph E. Shepard, all of San Jose, Calif.

[73] Assignee: International Business Machines Corporation, Armonk, N.Y.

[22] Filed: Mar. 31, 1970

[21] Appl. No.: 24,261

[52] U.S. Cl. ..................................101/93 C, 271/64, 271/3, 101/230, 101/66, 101/2

[51] Int. Cl. ..........................................B41j 1/54, B41j 5/02

[58] Field of Search .......................101/93 C, 45, 66, 2, 230; 347/74; 271/64, DIG. 9; 197/130

[56] References Cited

UNITED STATES PATENTS

| | | | |
|---|---|---|---|
| 2,253,052 | 8/1941 | Schubert et al. | 271/3 RD |
| 3,329,424 | 7/1967 | Rabek | 271/64 |
| 3,356,021 | 12/1967 | May et al. | 101/93 C |

*Primary Examiner*—William B. Penn
*Attorney*—Hanifin and Jancin and Shelley M. Beckstrand

[57] ABSTRACT

A ticket-handling mechanism for processing commutation tickets which includes a drive means for carrying the ticket in a circular path past a magnetic transducer for reading and updating machine readable fare information. A tumbling station removes those tickets which cannot be read and returns them in a flipped-over condition to said drive means. A print station prints fare information on the ticket in a consistent manner regardless of the orientation of the ticket. The ticket-handling mechanism is adapted for use in a commutation entry gate, exit gate, or ticket vendor.

7 Claims, 7 Drawing Figures

INVENTORS
THOMAS A. HICKOX
GORDON H. MAY
JOSEPH E. SHEPARD

BY Shelley [illegible] Beckstrand
ATTORNEY

ANALYZING, ORIENTING AND PRINTING MEANS IN TICKET HANDLING MECHANISM

CROSS-REFERENCE TO RELATED APPLICATIONS

The subject invention is an improvement over the selective printer and system for processing tickets having magnetic information thereon of U.S. Pat. No. 3,356,021, by G. H. May, et al. and of common assignee.

BACKGROUND OF THE INVENTION

1. Field of the Invention

This invention relates to a fare collection and passenger gate ticket-handling mechanism including means for performing various operations controlled by the sensing or analyzing of date from said ticket.

2. Description of the Prior Art

The above-noted U.S. Pat. No. 3,356, 021 provides for a ticket-handling mechanism for processing commutation tickets which includes a ticket orientation sensing means for directing a ticket to one of alternate paths past a magnetic transducer for reading and updating machine readable fare information and a print station for printing fare information on the ticket in a consistent manner regardless of the orientation of the ticket. As there described, the drive drum 31 and the two receiver rollers 32 and 33 require reversing means plus two additional magnetic heads 26 to sense and control the direction of drive 31 for processing any orientation ticket insertion.

Reversing mechanisms per se incorporating a constantly rotating reversing roller and a spring for feeding a sheet that has been driven past said roller on one side to return past the other side are also known in the art. However, these reversing mechanisms are not able to function correctly with badly bent, warped, or mutilated cards such as those carried by commuters, in that the cards often hang up on the said one side without engaging said other side to be driven in a reverse direction. Nor do such references provide for selective operation, responsive to card orientation, for returning a card to a read/write drum for reading and updating of magnetic information on said card.

SUMMARY OF THE INVENTION

It is therefore an object of the present invention to provide an improved fare collection system for rapid transit systems and the like.

It is a further object of the invention to eliminate the need for extra sensing heads for controlling the starting, stopping, or reversing means of a ticket drive for carrying said tickets past a read/write station.

It is a further object of the invention to provide a mechanism which will accept a magnetic ticket having a stripe on one side thereof which may be inserted in any orientation without requiring the stopping and starting of the driving and carrying means within the device.

It is a further object of the invention to provide a mechanism for handling mutilated, bent, and warped tickets, for carrying them past various work stations and for tumbling or reversing their movement.

The above objects are achieved by providing a ticket-handling mechanism comprising a constantly rotating drive roller. A read head senses whether the inserted ticket carries the magnetic stripe on the surface of the ticket which is capable of being read. Tumbling means are provided for flipping over a ticket which is inserted in an orientation which cannot be read, by removing said ticket from said drive, reversing it and returning it to said drum in an orientation which can be read.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figures 1, 3:
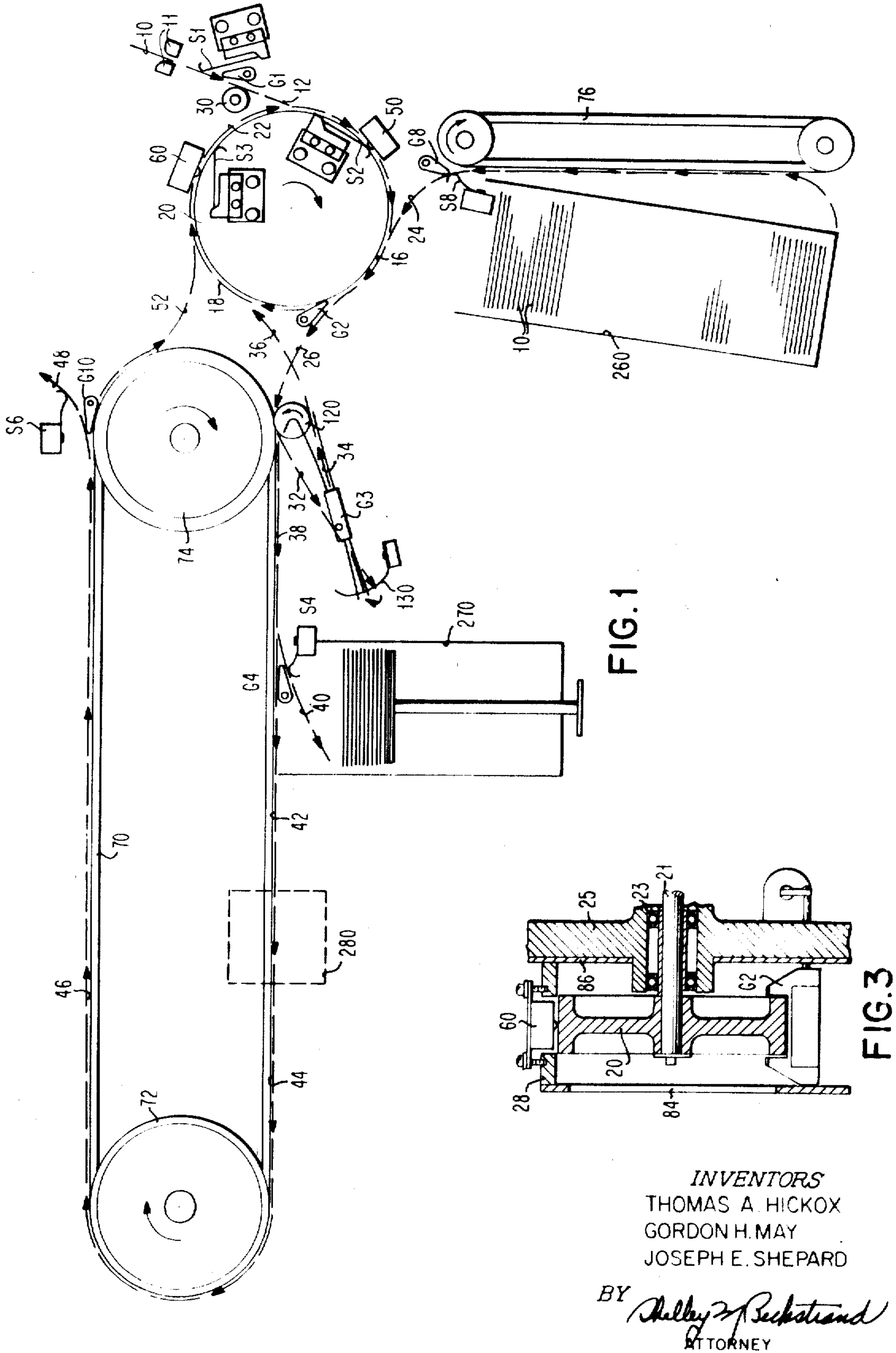
FIG. 1 is a diagrammatic view showing the card path and the various gates and switches for controlling the movement of said card within the device.
FIG. 3 is a cross section view along line AA of FIG. 1, showing the magnetic transducer, a typical gate, and the rotating drive.

Referring now to the drawings, a detailed description of the preferred embodiments of the invention will be given.

Commutation Ticket

Referring to FIG. 1, each ticket-handling mechanism is provided with an opening 11 for receipt of a ticket presented by a passenger. The device of FIG. 1 may also be provided with money receiving slots and an instruction display panel or area (not shown). Ticket opening 11 is adapted to receive ticket 10, such as of the type shown in FIG. 2 of U.S. Pat. No. 3,356,021. This ticket may be made of paper or other suitable material and contain two vertical columns separated by a strip of magnetic or otherwise machine readable information bearing material. The columns receive printing from the printing device of the ticket-handling mechanism indicating the place and price of the ticket purchased, the entry and exit points for subsequent uses of the ticket and the remaining value of the ticket at any time. The magnetic stripe is encoded with magnetic information at the time of its issuance, and portions of this magnetic information are updated and revised for each use of the ticket.

One of the important features of the invention is the ability of the ticket-handling mechanism of FIG. 1 to accept inserted tickets 10 through slot 11 in any orientation, i.e., upside down, right side up, and with the magnetic stripe facing either direction. The magnetic strip may be provided with appropriate magnetic coding marks indicating which is the start and which is the end of the magnetic code sequence, as further described in the above-referenced U.S. Pat. No. 3,356,021.

Entry Station

Referring to FIG. 1 in connection with FIG. 2, the ticket entry station will be described. Ticket 10 is inserted through opening 11 where its presence in the slot 11 is detected by microswitch S1. Receiving and aligning roller 30 engages card 10 and drives it through slot 11 in the card guide wall 28. Roller 30 is of a cup roll design which both drives the card in a longitudinal direction and aligns said card against a registration wall. Gate G1 is mounted in card guide wall 28 and is adjustable between a position where it blocks the passage of a card 10 through slot 12 or an open position where it permits such passage.

Circular Drive Drum

Referring again to FIG. 1 in connection with FIGS. 2 and 3, the circular drive drum 20 for carrying tickets 10 in a circular or otherwise closed path will be described. Mounted in bearing 23 in wall 25 is shaft 21. Fixedly attached to one end of shaft 21 is circular drive drum 20, and to the other side (not shown) is the drive motor. Drum 20 is driven at a constant velocity in a clockwise direction, as shown in FIG. 1, within card guide wall 28. As ticket 10 passes through the input slot 12, it is engaged by the outside periphery of drum 20 which carries the card in a circular path between the outside surface of said drum and the inside surface of the card guide wall 28.

A plurality of shoes 80 are positioned around the periphery of the drum in wall 28, with the distance between the shoe 80 and the outside periphery of wall 20 being adjustable by operation of screws 82. Back edge guide wall 86 is fixedly attached to base 25, and front edge guide wall 84 is attached to the outside of card guide wall 28 in such a manner to contain a card 10 between said walls 84 and 86 as it is carried in a circular path by drum 20. With drum takeoff gate G2 in an open position, to be described later, drum 20 carries card 10 in the circular path defined by arrows 14, 16, 18, and 22.

Mounted in wall 28 are read head 50 and write head 60 and mounted to base 25 between the inside surface of drum 20 and the back registration wall 86, are microswitches S2 and S3. Throughout the following discussion, it will be assumed that head 50 is adapted for sensing the magnetic data encoded in the magnetic stripe on card 10, while write head 60 is adapted for updating and re-recording said information. As will be apparent to those skilled in the art, one read/write head may replace the separate read and write heads, at the expense of requiring an additional partial revolution of the card 10 about the periphery of drum 20 in order to perform the read, write, and check functions under the same head. Microswitch S3 is shown slightly downstream with respect to card travel from write head 60, and may be used to signal the arrival of the leading edge of said card 10 at said switch for permitting the writing of information through head 60 on the magnetic stripe on the card at a position removed from the leading edge of said card by the distance between the contact of microswitch S3 and the write gap of head 60. Obviously, the microswitch S3 may be positioned closer to head 60. For example, microswitch S2 is positioned to sense the arrival of leading edge of card 10 immediately over the read gap of head 50 to signal the arrival of the leading edge of the magnetic track on card 10 over head 50.

Drum takeoff gate G2 is mounted to base 25 and adjustable between an open position which permits card 10 to follow the path of arrow 16 to 18, and a closed position in which the generally U-shaped gate straddles the drum 20 in such a manner as to engage card 10 and drive it from the region shown by arrow 16 into the region shown by arrow 26.

Figure 2:
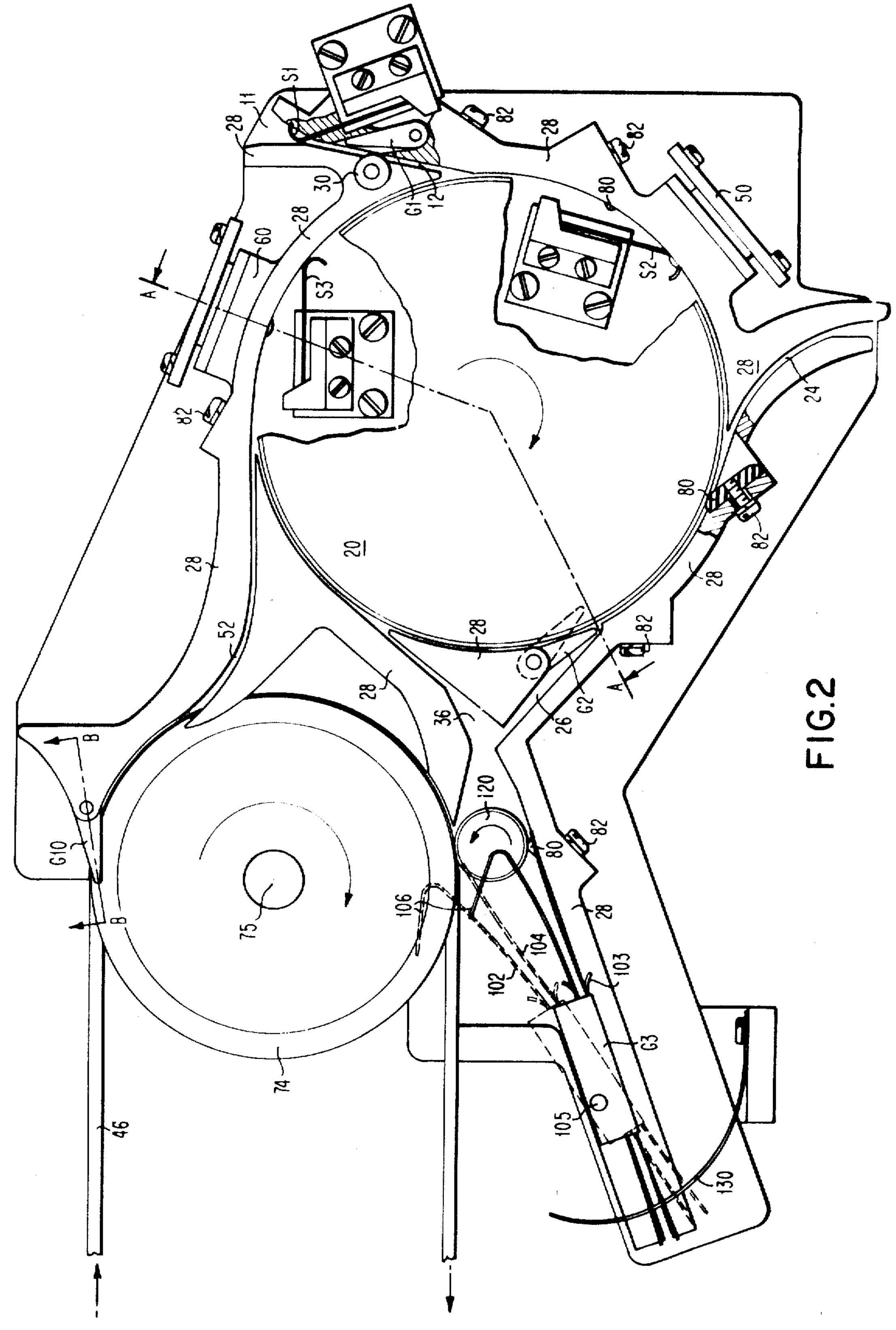
FIG. 2 is a diagrammatic view, partly in section, of the read/write drum and tumbling stations of FIG. 1.

In FIG. 3, said gate G2 is shown in the position of the dotted lines of FIG. 2, showing the gate in the drum straddling position for taking the card off of the drum.

Card Reversing or Tumbling Means.

Figure 5:
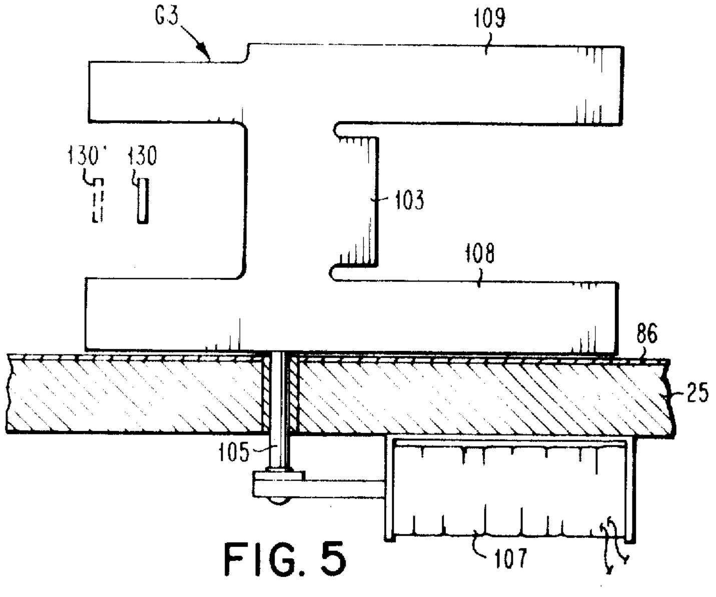
FIG. 5 is another view of tumbling gate 100 of FIGS. 1 and 2.

Referring to FIG. 1 in connection with FIGS. 2 and 5, the reversing or tumbling means of the invention will be described. As shown in FIG. 1, the reversing means comprises a constantly rotating roller 120, spring return 130, and gate G3. These elements, in cooperation with slots 26 and 36 in wall 28 and gate G2, remove cards 10 from drum 20 and return them to the drum with the surface previously against the drum surface now away from said drum, and the leading and trailing edges of the card 10 reversed.

Roller 120 may be of a cup roll design similar to that of roller 30; i.e., a combination registration and drive roller for driving a card forward in longitudinal direction while registering it against a registration surface such as 84 or 86.

Gate G3 is fixedly attached to shaft 105 which is rotated within wall 25 by action of solenoid 107. Gate G3 comprises a pair of guide members 102 and 104 defining therebetween a throat area, inner lips 103, and an offset portion 106. As shown in FIG. 5, guide 104 is in the general shape of an H, with one portion of the H straddling the idle roller 120, and the other portions straddling a spring return means 130, which spring is also mounted to base 25. The upper guide 102 is of a similar shape as lower guide 104 when viewed as seen in FIG. 5, with one portion straddling the wheel 74 and belt 46 when in the upper position as shown by the dotted lines in FIG. 2, or the constantly rotating roller 120 when in the lower position as seen by the solid lines in FIG. 2. Offset portion 106 of guide means 102, when said gate G3 is in the lower position as shown in FIG. 2, serves to guide a card passing from region 126 over the top of roller 120 to follow belt 46 along the path shown by arrow 38 in FIG. 1. Lips 103 serve to keep a card entering gate G3 from hanging up on the outside surface of said gate G3 and to pass between guides 102 and 104 such that the original leading edge of said card engages spring 130. A screw 82 adjusts a shoe 80 to control the force exerted by roller 120 on the card 10 as it passes beneath said roller.

In operation, assuming gate G2 to be in the pickoff position shown by the dotted lines in FIG. 2, and with gate G3 in the reversing position shown by the dotted lines in FIG. 2, as card 10 travels around the periphery of drum 20, it will engage gate G2 and be driven into slot 26. Thence the card passes across the top of roller 120, engaging guide 102 and being driven down the throat between guide 102 and 104 by the action of idle rollers 120 and the belt 46 carried by wheel 74. The card continues between the lips 103 until it engages spring 130. Thereupon it is driven a slight amount more determined by the length of the card until spring 130 is deflected to the position shown as 130' in the FIG. 5. At this point, the gate G3 is rotated about shaft 105 down to the position shown by the solid lines in FIG. 2, with upper guide 102 carrying the original trailing edge of card 10 from the top of roller 120 to the bottom of said roller. With gate G3 in the lower position, the card is free to be driven back beneath the bottom portion of roller 120 by spring 130 as it returns to its original unflexed position, driving the card towards roller 120, such that roller 120 engages the card against shoe 80 and drives said card into the guide region 36 thence returning said card to the drive drum 20 along the path shown by arrow 18. As a result of this operation, the leading edge of card 10 as it was taken off the drum by G2 becomes the trailing edge of the card as it returns to said drum after reversal and the card surfaces are reversed with respect to the drum or heads.

Card Hopper

Referring now to FIG. 1, a diagrammatic representation is given of a blank card hopper 260 containing a plurality of blank cards or tickets 10. Herein, cards 10 are fed from the bottom of hopper 260 and driven upwards along belt 76 until they engage gate G8. Switch S8 is positioned to sense the presence of a card at gate G8. Gate G8 may be operated to permit passage of a card past switch S8 along the region shown by arrow 24 until it engages and is carried by drum 20 around its periphery in the circular path.

Card Escrow, Print, and Exit Stations

Referring to FIG. 1, shown in diagrammatic view are the card escrow station 270, the card printer station 280, and the card exit gate G10 and switch S6.

Mounted to base 25 are pulley wheels 72 and 74, carrying in an elongated path moving belt 70. Said elongated path is essentially an extension of the closed path of drum 20 for giving space for additional work stations which need not be utilized until after processing of the machine readable information on the ticket, thus minimizing the time required for said processing by minimizing the length of said closed path. The extension, or elongated path, is also continuously moving in a given direction. As wheel 72 and 74 rotate, belt 70 follows a path which carries the card along the path shown by arrows 38, 42, 44, and 46.

With gate G3 in the lower position as shown in FIG. 1, a card 10 which has been removed from drum 20 and driven along the path shown by arrow 26 will be deflected by offset portion 106 of gate G3 to engage belt 70 and be carried along the path shown by arrows 38. If the card is to be removed from the belt, gate G4 is closed, causing said card to follow the path of arrow 40 to enter the escrow stack 270. Passage of said card into the escrow stack is sensed by switch S4. With gate G4 open, the card is carried by belt 70 past the escrow station along the path defined by arrow 42 to print station 280, which station 280 may be similar to that described in the above-referenced U.S. Pat. No. 3,356,021 in FIGS. 4, 5, and 6. Print station 280 may further include a plurality of stops (not shown) selectively operated for holding (against movement by belt 70) card 10 beneath the printer head at the selected print location on said card.

Figure 4:
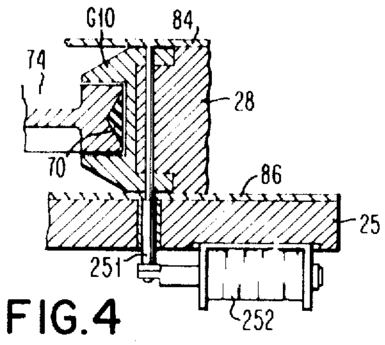
FIG. 4 is a cross section view along line BB of FIG. 2 showing in greater detail a typical gate.

From station 280, the card is carried by belt 70 along the path shown by arrow 44, around wheel 72, thence along the belt at arrow 46 to the exit station. At the exit station, a gate G10 may be positioned to deflect the card up out of the ticket-handling mechanism along the area shown by arrow 48 to be retrieved by the customer, or it may hold card 10 at the exit station, or it may deflect said card along path 52 to return it to drum 20. Switch S6 detects the presence of a card at the exit station and also its removal by the customer, FIG. 4 is a view along section BB of FIG. 2 showing the gate G10. Gate G10 is mounted to wall 25 on rotatable shaft 251, which shaft is operated by solenoid 252. In the closed position, as shown in FIG. 4, gate G10 straddles the outside of wheel 74 and V belt 70, for picking a card off of said belt and driving it into the exit station past switch S3. Alternatively, the gate G10 may be rotated off of the wheel 74 such as to permit it to pass along the path shown by arrow 52 to drum 20, or may be positioned to block movement of the card entirely. Of course, the exit station comprising gate G10 and switch S3 may be moved to various positions along the upper span of belt 70 shown generally by arrows 46.

Card Processing Control Logic

Figure 6:
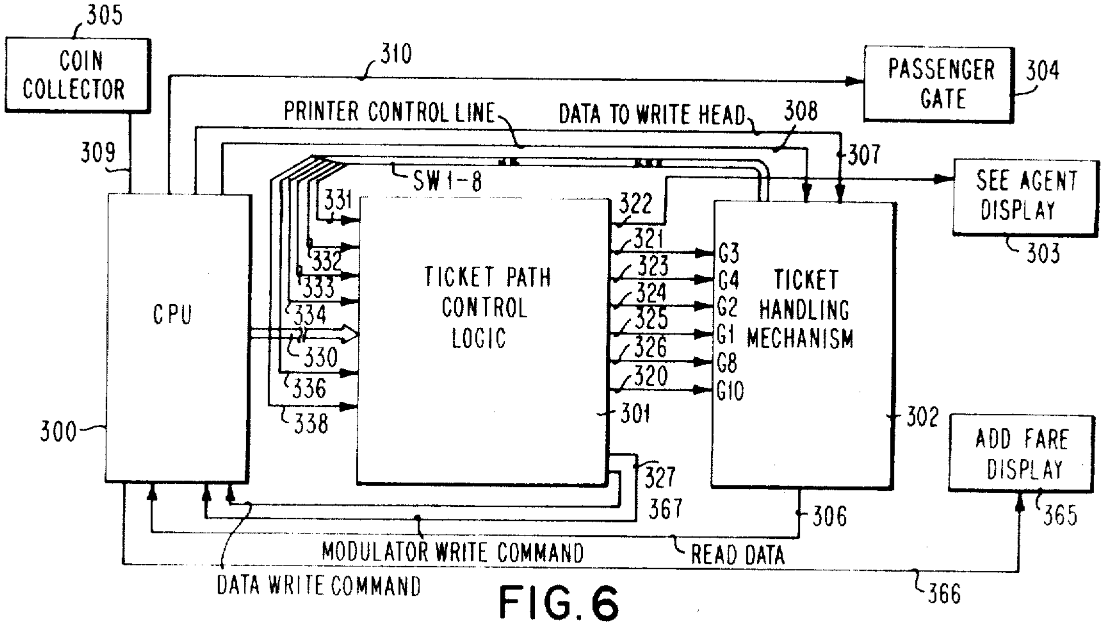
FIG. 6 is a block diagram of the control circuitry.

Referring now to FIG. 6, in connection with the above noted U.S. Pat. No. 3,356,021, the control logic of the invention will be described. As shown in FIG. 6, said control logic comprises a central processing unit or computer 300, ticket path control logic unit 301, ticket-handling mechanism 302, coin collector 305, passenger gate 304, and see agent display 303. The ticket path control logic 301 of FIG. 6 is shown in greater detail in FIG. 7. Referring to FIG. 1 of the above-referenced patent, a diagrammatic view of a preferred system is presented including a computer which controls a plurality of passenger gates 12 through a multiplexer 20. The following description will assume a configuration having just one passenger gate.

Referring to FIG. 6, the central processing unit is connected to coin collector 305 along line 309, which line may comprise a plurality of signal lines for communication of the amount of coins inserted, the amount to be returned, and so forth. CPU 300 is also connected to ADD FARE DISPLAY 365 along line 366. The central processor 300 is also connected along line 310 with the passenger gate 304, which line 310 may comprise a plurality of lines for controlling the operation of the passenger gate in, for example, a normally open or a normally closed position. Whether or not the passenger gate 304 is operated to permit passage of the passenger may depend upon the results received from reading the data on an inserted ticket 10 as transmitted from the ticket-handling mechanism 302 to the CPU 300 along line 306. The ticket in the ticket-handling mechanism 302 is updated by the CPU 300 along lines 307 and 308, which control the write head 60 and print station 280, respectively. Information is fed along line 330 from CPU 300 to the ticket path control logic 301, said line 330 including lines 311–319 and 329 shown in FIG. 7: DATA VALID, LRC VALID, INSUFFICIENT VALUE, NO LINE SPACE, EXACT FARE, HOPPER INOPERATIVE, ENABLE TICKET, DISPENSE TICKET, MAIN RESET, and POWER ON RESET control lines. Switches S1 through S8 in the ticket-handling mechanism 302 signal their status to the ticket path control logic 301 along lines 331–338. The see agent display 303 is controlled by the ticket path control logic 301 along line 322. Gates G3, G4, G2, G1, G8 and G10 in ticket-handling mechanism 302 are controlled by lines 321, 323, 324, 325, 326 and 320, respectively, from the ticket path control logic 301. Control logic 301 transmits modulator and data write command information to CPU 300 along lines 327 and 367.

Ticket Path Control Logic

Figure 7:
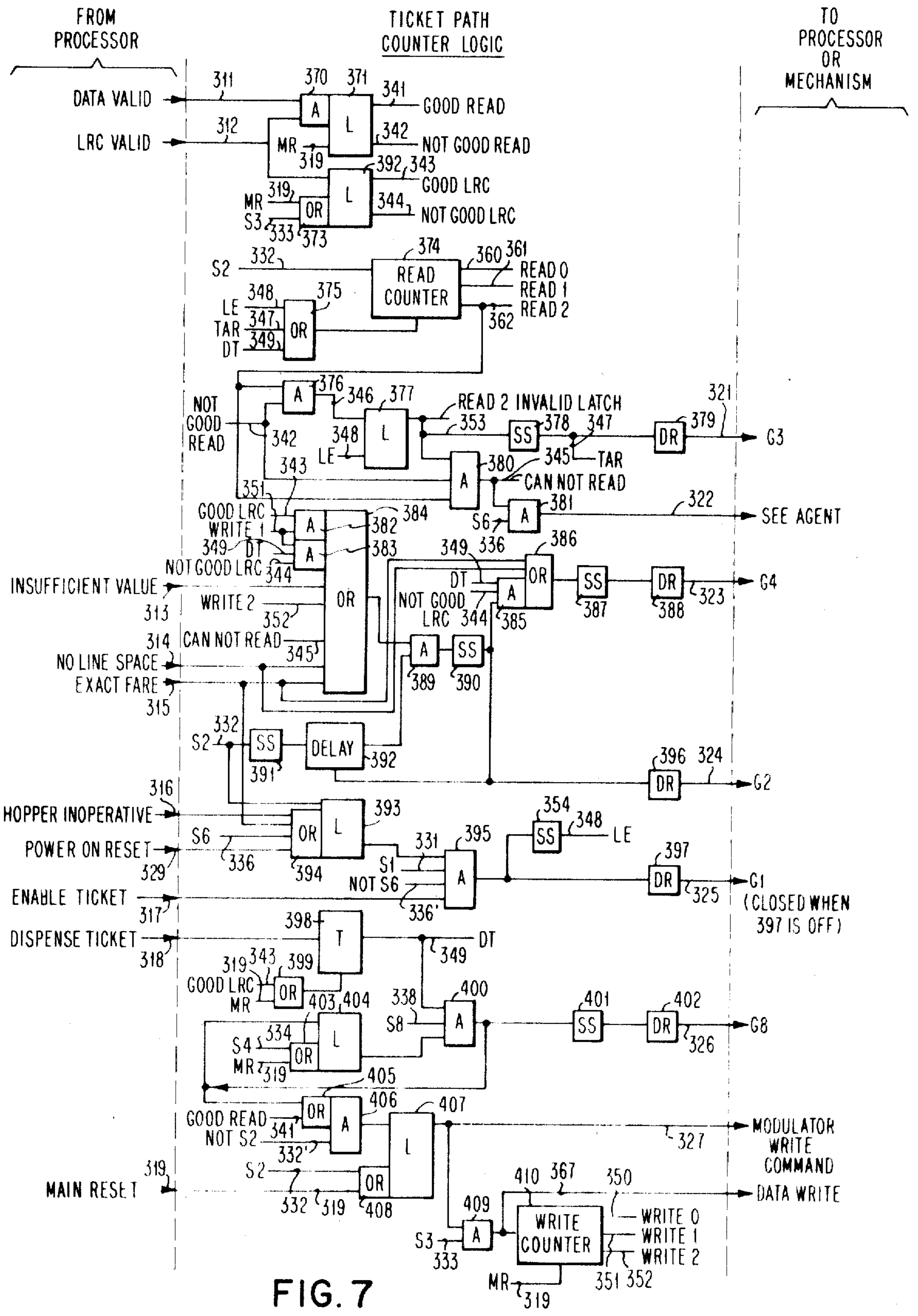
FIG. 7 is a block diagram showing in greater detail the control logic of FIG. 6 for the ticket-handling mechanism, for controlling the various gates, switches, and transducers shown in FIG. 1.

Referring now to FIG. 7, the ticket path control logic 301 of FIG. 6 will be described in greater detail. The left-hand side of the figure represents the input lines from the central processor 300, while the right-hand side of the figure represents the output lines to the ticket-handling mechanism 302, the ticket agent display 303, or the CPU 300. The various lines from the switches S1–S8 of ticket-handling mechanism 302 back to the control logic 301 appear within the body of the FIG. 7 as they are pertinent.

Referring first to the input lines from processor 300, a brief discussion will be given of the general significance of the control lines 311–319, 329. DATA VALID line 311 signals control logic 301 that the processor 300 recognizes valid data along line 306 from read head 50 in the ticket handling mechanism 302. LRC VALID line 312 signals that the data read from the ticket has a valid longitudinal redundancy character check. INSUFFICIENT VALUE line 313 indicates that the value of the ticket being read in the ticket-handling mechanism 302 is insufficient to pay for the cost of the trip which the passenger has taken. NO LINE SPACE line 314 signals that all the print positions on the ticket have been used and that a new ticket must be prepared. EXACT FARE line 315 signals that the value of the ticket exactly equals the cost of the ride. HOPPER INOPERATIVE line 316 signals that hopper 260 is empty or otherwise inoperative. ENABLE TICKET line 317 signals that the ticket mechanism is online and conditioned to accept a customers' ticket. DISPENSE TICKET line 318 signals ticket path control logic 301 that a new ticket be dispensed from hopper 260 such as when a sufficient amount has been inserted in collector 305 for dispensing a new ticket.

The other two inputs from the processor to the ticket path control logic are POWER ON RESET line 329 and MAIN RESET line 319, utilized by the processor 300 for resetting the various latches and triggers during power on or other situations under program control.

Referring further to FIG. 7, the logic circuitry of ticket path control 301 will next be described.

DATA VALID line 311 is fed into AND circuit 370 along with LRC VALID line 312. The output of AND circuit 307 sets latch 371, while a pulse on MAIN RESET (MR) line 319 resets said latch. The output of latch 371 appears on line 341 when set, indicating that the CPU has received good read data along line 306, and on NOT GOOD READ line 342 when not set. GOOD READ LINE 341 serves as one input to OR circuit 405, while NOT GOOD READ line 342 is fed into AND circuit 376, and 380.

LRC VALID line 312 is also fed into the set position of latch 372, which gives an output on GOOD LRC line 343 indicated the data on line 306 to the CPU is valid. MAIN RESET line 319 and switch S3 line 333 are fed into OR 373, the output of which resets latch 372 giving an output on NOT GOOD LRC line 344. Reset of latch 372 by operation of switch S3 requires the CPU to check redundancy and set latch 372 for each revolution of card 10 past head 60. With latch 372 set, a positive logic level appears on GOOD LRC line 343 and is fed into AND 382 and OR 399. When reset, latch 372 gives an output on NOT GOOD LRC line 344 which is fed into AND 383, and AND 385. Read counter 374 is controlled by pulses on line 332 from switch S2. With each pulse on line 332, the read counter steps its output from READ 0 line 360 to READ 1 line 361 and then to READ 2 line 362. Read counter 374 is reset to zero by the output of OR circuit 375, which has as its inputs LOCKOUT ENABLE line 348, TURNAROUND RESET line 347 and DISPENSE TICKET line 349. The condition READ 2 is fed along line 362 to AND circuits 376 and 380, indicating that a ticket has passed switch S2 twice without passing into the write mode. As will be apparent to those skilled in the art, more than two passes past switch S2 could be required by providing a read counter which can increment through more attempted reads by head 50 before the output of the counter is interpreted as a "cannot read" condition for requiring flip over of card 10.

The output of AND-circuit 376 is fed along line 346 to set latch 377, and to OR 348. Latch 377 is reset by a signal on LOCKOUT ENABLE line 348. The output of latch 377 is fed along READ 2 INVALID LATCH line 353, to AND 380, and to single,shot 378. The output of single shot 378 is fed along TURNAROUND RESET line 347 to driver 379, the output of which operates gate G3 along line 321; TURNAROUND RESET line 347 is also fed to OR 375 to reset read counter 374.

The output of AND 380 is interpreted as "cannot read" and is fed along line 345 to AND 381, and to OR 384. The other input to AND 381 is on switch S6 line 336, with the output of said AND circuit 381 operating SEE AGENT display along line 322. The inputs to AND 382 appear on GOOD LRC line 343 and WRITE 1 line 351 from the WRITE COUNTER 410, with the output of said AND 382 being fed into OR 384. The inputs to AND 383 are WRITE ONE line 351, DISPENSE TICKET line 349, and NOT GOOD LRC line 344; the output of AND 383 is fed into OR 384. OR 384 has as its other inputs INSUFFICIENT VALUE line 313, WRITE 2 line 352 from write counter 410, CANNOT READ line 345, NO LINE SPACE line 314, and EXACT FARE line 315. The output of OR 384 is fed into AND 389. The other input to AND 389 is the output of DELAY-circuit 392 which is controlled by a signal on switch S2 line 332 from single-shot 391, and which serves to prevent AND 389 from having its inputs satisfied until OR 384 has settled into correct combinations and output, preventing a ticket from being removed from the drum prematurely. The output of AND 389 is fed to single-shot 390, thence to AND-circuit 385, and to driver 396 which operates gate G2 along 324. NO LINE SPACE line 314 and EXACT FARE line 315 are also fed to OR 386. The other input to OR 386 comes from AND 385 which has as its input DISPENSE TICKET line 349, NOT GOOD LRC line 344, and the output of single-shot 390. The output of OR 386 is fed to single-shot 387 and thence into driver 388 for operating gate G4 along line 323.

Latch 393 is set by a signal along line 332 from switch S2, and is reset by the output of OR 394. OR 394 has as its input HOPPER INOPERATIVE line 316, switch S6 line 336, EXACT FARE line 315, and POWER ON RESET line 329. In the reset condition, the output of latch 393 is fed into AND 395, the other inputs of which are switch S1 line 331, ENABLE TICKET line 317, and NOT S6 line 336'. A signal on NOT S6 line 336' is interpreted as indicating that switch S6 is open, with no card located in the exit station. The output of AND 395 is fed to driver 397 which operates gate G1 along line 325, and through single-shot 354 to LOCKOUT ENABLE line 348, and thence to OR 375, to reset latch 377.

Trigger 398 is set by DISPENSE TICKET line 318, and reset by the output of OR 399, the inputs of which are GOOD LRC line 343 and MAIN RESET line 319. The output of trigger 398 is fed along DISPENSE TICKET line 349 to AND 385, AND 383, OR 349, and AND 400. The other inputs to AND 400 appear along line 338 from switch S8 and from the reset position of latch 404. The output of AND 400 is fed to the single-shot 401, and thence to driver 402 from operation of gate G8 along line 326; the output of AND 400 is also fed to the set position of latch 404 and to OR 405. Latch 404 is reset by a signal along line 334 from switch S4 or along MAIN RESET line 319 through OR circuit 403. The other input to AND 406 is along line 332' indicating that switch S2 is open. The output of AND 406 sets latch 407. Latch 407 is reset through OR circuit 408 by a signal on line 332 from switch S2 or by MAIN RESET line 319. The output of latch 407 is sent to the main processor 300 along MODULATOR WRITE COMMAND line 327 and also to AND 409. The other input to AND 409 appears along line 333 from switch S3, and its output is fed to write counter 410, and to CPU 300 along WRITE DATA COMMAND line 367. Write counter 410 is reset by a signal on MAIN RESET line 319. With each pulse appearing at the output of AND 409, write counter 410 has its output incremented from WRITE 0 line 350, to WRITE 1 line 351, and to WRITE 2 line 352. Write 1 line 351 is fed back to AND 382 and WRITE 2 line 352 is fed back to OR 384.

With the above description of the ticket path control logic 301, and by way of example, the following analysis of the various output lines to the processor 300 and mechanism 302 from said control logic will be given. The analysis of each output is not intended to be exhaustive, as the various functions of the device may be largely controlled by the CPU program.

Entry Gate G1

Entry gate G1 is normally closed. Operation of driver 397 opens gate G1 to permit a ticket to be inserted. This occurs when the output of AND circuit 395 indicates that a new ticket is being inserted past switch S1 as noted on line 331 to AND 395 during the time that a previously inserted card has reached S6, resetting latch 393 and has been removed as indicated by the NOT S6 line 336' to AND 395. Also, tickets may be inserted if there is no ticket at the exit station after a power on reset, or after an exact fare ticket has been loaded into hopper 270, or after a ticket dispensed from supply 260 has been loaded into hopper 270.

Drum Takeoff Gate G2

Drum takeoff gate G2 is operated by driver 396 when a ticket is to be removed from the drum for any condition, such as for reversal in the tumbling station or for further processing or stacking in the escrow station. Thus, gate G2 is operated at a particular time after switch S2 indicates card 10 has passed read station 50 and the output of OR-circuit 384 signals AND-circuit 389 that the ticket has insufficient value to pay for the trip taken, the ticket cannot be read by head 50, the ticket has been written and checked as indicated by AND-circuit 382, a ticket fed from hopper 260 has failed a LRC check after a first write attempt as indicated by AND 383, a ticket inserted by a customer has failed LRC check after two write attempts, or other conditions under control of the central processor along lines 313 through 315.

Reversing Gate G3

Gate G3 is operated by driver 379 when READ 2 INVALID latch 377 has been set by the output of AND-circuit 376 indicating that a card has passed read head 50 two times without a successful read. This is determined by switch S2 incrementing read counter 374 to an output on READ 2 line 362 simultaneously with a NOT GOOD READ indication on line 342 from latch 371 indicating that said latch has not been set by a signal on line 311 denoting that valid data has been received at the processor. After gate G3 has been operated once on a given card, even if the card is unsuccessfully read twice on the second go-around, as indicated by a signal on line 362, gate G3 will not be operated for a second flipover operation because latch 377 will not have been reset by LOCKOUT ENABLE line 348. Latch 377 will only be reset and thus permit a new firing of SS 378 on an initial ticket insertion after a ticket has been removed from the exit station, stacked in hopper 270, or a reset under CPU control.

See Agent Display

A signal on line 322 lights a SEE AGENT instruction on the display panel of the ticket-handling mechanism (not shown) and is operated by the output of AND-circuit 381 indicating that a card is in the exit station and that said card cannot be read.

Card Stacker Gate G4

Driver 388 operates card stacker gate G4 to remove cards from belt 70 after the output of single-shot 390 indicates that said card has been removed from drum 20, and one of the various conditions is met for not returning that card to the customer. Such conditions include the following: the processor 300 signals the control logic 301 that there is no line space on the card for printing, that the value of the card represents the exact fare for the ride, or a ticket which has been written has not passed the redundancy check.

Ticket Feed Gate G8

Driver 402 operates gate G8 to feed a ticket from hopper 260 into the drum 20 when the computer signals along DISPENSE TICKET line 318 that a ticket is to be dispensed, switch S8 signals that a ticket is available, and a ticket previously dispensed has been removed from the drum and placed in stacker 270, or latch 393 has been reset by MAIN RESET after completion of previous transaction.

Modulator Write Command

The ticket path control logic 301 signals to the CPU 300 along line 327 that said processor may write on a ticket through head 60 when a ticket which has been placed on the drum has been successfully read, and the ticket has passed switch S2 so it is not being read by head 50. During this time, CPU 300 writes, for example, all ones or zeros.

Date Write Command

Logic 301 signals CPU 300 along line 367 that the ticket is in position to be updated with new information in the data bearing portion of the magnetic stripe when switch S3 is actuated by the ticket. The CPU program can time out the data area and continue with writing all ones or zeros, for example, after the data portion is past.

Operation

Referring now to FIG. 1 in connection with FIG. 7, and by way of illustration, the operation of the ticket-handling mechanism of the invention will be described for various exit gate conditions.

A customer having a ticket approaches the exit gate and inserts his ticket 10 in throat 11. Gate G1 is opened, permitting passage of the ticket into slot 12 unless there is a ticket already in the mechanism. As ticket 10 passes the switch S2, the magnetic read head 50 senses the magnetic data in the magnetic stripe. If card 10 was inserted with its stripe towards the drum, head 50 is unable to sense the magnetic data. The card is driven past read head 50 again to verify read failure. Thereupon gates G2 and G3 are operated to remove card 10 from the drum 20 and to reverse the card and return it to the drum in a flipped over condition. As ticket 10 then passes switch S2, head 50 reads the ticket. If head 50 is successful in reading the data on the card (either before or after flip over), it is carried once again past head 60 for update by the computer, and then gate G2 and G3 are operated to permit the ticket to pass along belt 70 to print station 280. At print station 280, the card is stopped at the proper line for printing a new line of updated information. After printing the remaining value, the ticket is driven to the out slot past gate G10 and switch S6. As the passenger removes his ticket past the switch S6, said switch signals the computer to open the passenger gate.

Assume that the passenger inserts a ticket 10 which has a remaining value, but no place to print; that is, line 20 has a remaining value printed on it. The ticket is inserted, and it is carried past the read head 50 which senses its value and the fact that there is no print station remaining. The ticket moves out of the drum area past the print station 280 to be held by gate G10 in escrow beneath the exit slot. At that point, a new ticket is fed onto the drum from hopper 260 below gate G8. This new ticket is encoded by write head 60 and checked by read head 50. Then as the new ticket passes out of the drum 20 past gate G2, the old ticket is permitted to pass gate G10 onto the drum 20, where it is removed by gate G2 and passed into the escrow stack 270 by gate G4. The new ticket is printed at station 280 and delivered to the passenger.

Assume now that the passenger inserts a ticket having the exact remaining value for the ride. That is, for example, where the cost of the ride is 50 cents and the value of the ticket is 50 cents. The ticket is inserted, passes the read and check conditions. Whereupon, the ticket is removed from drum 20, gate G4 operates and the ticket is put into the escrow stack 270. The passenger gate opens allowing the passenger to pass through.

Assume now that the passenger inserts a ticket into the exit gate with insufficient value. Ticket 10 is read by head 50, then checked and returned to the passenger past switch S6. Display 365 instructing the passenger to add fare is lighted. The passenger goes to an add fare unit (not shown) where he inserts his ticket. The add fare unit has a similar ticket handling mechanism to that shown in FIGS. 1 through 7. The ticket is read by head 50 in the add fare unit, whereupon the computer instructs the passenger to insert the exact amount required to receive an updated ticket which will be accepted in the exit gate. This ticket is then updated in the add fare unit, and taken by the customer to the exit gate where it is processed the same way as a ticket with correct remaining value.

The operation of the system of the invention as an add fare unit or as an entry gate is similar to that of an exit gate, with variations in functions under control of the CPU program and control logic as heretofore described.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for handling tickets having a magnetic strip on one side thereof comprising:
   a housing having an opening into which said ticket may be inserted with said stripe extending longitudinally;
   drive means for carrying said ticket in a circular path in one direction;
   sensing means for reading the data encoded in said magnetic stripe as said ticket is being carried by said drive means;
   reversing means for flipping over said ticket on said drive means; and
   control means responsive to a failure of said sensing means to read said data for rendering effective said reversing means;
   whereby said magnetic ticket may be inserted in any orientation and be read while carried on a constantly rotating drive.

2. The apparatus of claim 1 characterized in that said reversing means comprises:
   rotating means for driving said card in a first direction away from said drive means and in a second direction toward said drive means,
   first and second capstan means engaging spaced peripheral points on said rotating means for engaging said card against said rotating means,
   gate means for receiving said card as it passes said first capstan means and for moving said card to engage said second capstan means, with the trailing edge of said card as it is driven past said first capstan means in said first direction being the leading edge as it is driven past said second capstan means in said second direction.

3. The apparatus of claim 2 further characterized in that said reversing means further comprises:
   spring means deflected by said card as it is driven in said first direction for moving said card in said second direction into engagement with said second capstan means.

4. Apparatus for handling tickets having a magnetic stripe on one side thereof comprising:
   a housing having an opening into which said ticket may be inserted with said stripe extending longitudinally;
   drive means for carrying said ticket in a path in one direction;
   sensing means for reading the data encoded in said magnetic stripe as said ticket is being carried by said drive means;
   reversing means for flipping over said ticket on said drive means;
   control means responsive to said sensing means for actuating said reversing means when said sensing means is unable to read the magnetic information in said ticket as originally inserted;
   writing means for updating the data in said magnetic stripe;
   printing means for printing human readable characters on said ticket.

5. Apparatus for handling tickets having machine readable information on one side thereof comprising:
   a housing having an opening into which said ticket may be inserted with said information extending longitudinally;
   drive means for carrying said ticket in a closed path;

sensing means for reading said information while said ticket is in said path;

reversing means for removing said ticket from said path and returning it in a flipped over condition, control means responsive to a failure of said sensing means to read said information for rendering effective said reversing means to present said ticket to said sensing means in the proper orientation;

whereby a ticket inserted in any orientation may be readout without stopping or reversing the drive.

6. The apparatus of claim 5 further including write means for updating said information and print means for printing human readable characters, said write and print means being disposed adjacent said closed path.

7. The apparatus of claim 6 wherein said write and/or print means are disposed adjacent a card path extending between said closed path and an output opening in said housing.

* * * * *